March 4, 1947.  D. W. SHERMAN  2,417,019
AUTOMOBILE SUSPENSION
Filed July 26, 1944
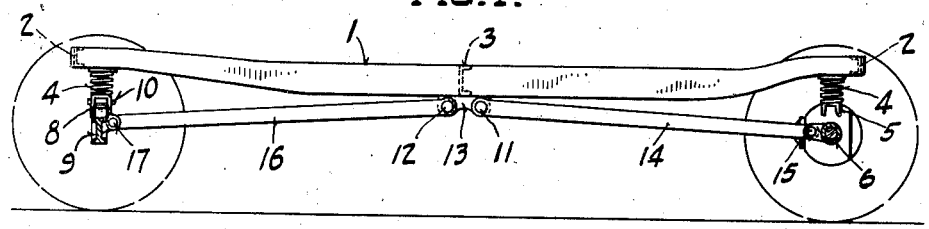
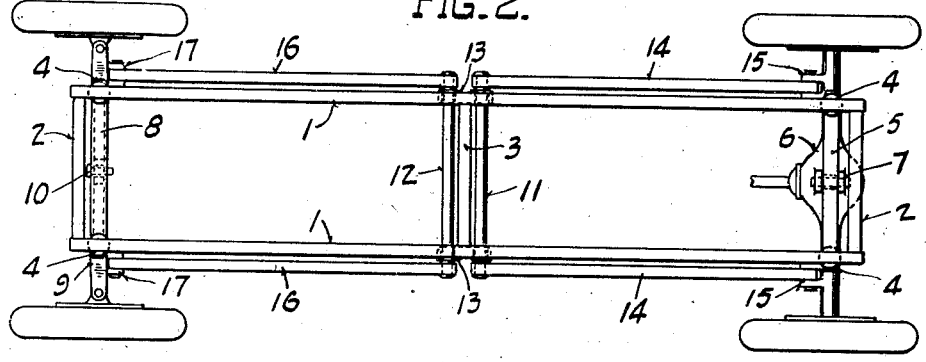
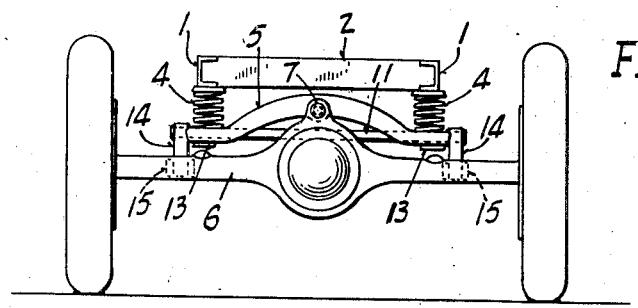
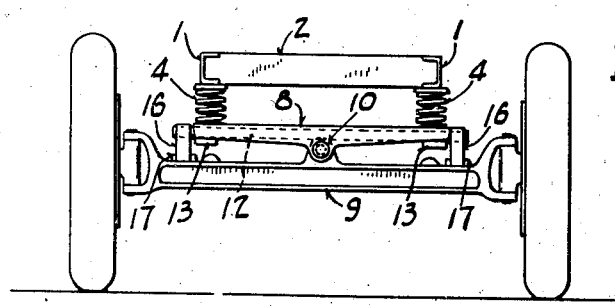
Donald W. Sherman
INVENTOR.
BY
ATTORNEY.

Patented Mar. 4, 1947

2,417,019

UNITED STATES PATENT OFFICE 2,417,019

AUTOMOBILE SUSPENSION

Donald W. Sherman, Shorewood, Wis., assignor to A. O. Smith Corporation, Milwaukee, Wis., a corporation of New York Application July 26, 1944, Serial No. 546,675

9 Claims. (Cl. 280—112)

This invention relates to an automobile suspension for supporting the sprung structure thereof, such as the body, frame, and engine, and linking thereto the unsprung parts comprising the wheels and the like. More particularly the invention is directed to a suspension which substantially eliminates torsional forces in the frame arising from uneven road surfaces.

One object of the invention is to provide a suspension that creates greater car passenger comfort.

Another object is to provide a suspension that results in fewer car squeaks and rattles.

Another object is to provide a suspension that increases the car's structural durability.

Another object is to provide a suspension that permits the use of a lighter and less expensive chassis frame.

Another object is to provide a suspension that permits both convertible and sedan bodies to be mounted on duplicate chassis.

Another object is to provide a suspension that can be readily and economically constructed.

The conventional automobile suspension supports the sprung structure such as the frame, body and engine of the automobile at approximately the car ends and resists side roll at these points. Various suspension types such as coil springs, leaf springs, cross axles and linkages have been employed.

With the sprung structure of the automobile supported at the four corners, roll over of the frame and body under the influence of side forces is resisted, but an impact on one wheel results in loading of the sprung structure so as to cause twisting or torsion.

Torsional loading is harmful and results in structural disturbances as the car body is not an efficient member to resist torsional deflection due to the door openings. Similarly the frame is likewise inefficient because clearances restrict its size and the disposition of its detail members for resisting torsion.

The present invention eliminates the need for four-corner support of the sprung structure by providing a resistance to roll over at the sides of the car adjacent the center of gravity of the sprung structure. This enables the use of supports for the frame disposed on the longitudinal center line at each end. Planarity of the structure is maintained by vertical bending rigidity in the frame side rails and cross members.

In obtaining the suspension characteristics described, the invention in general provides pivotal means at the longitudinally extending center line of the car between the unsprung and sprung structure at both ends of the car. In addition cross torsion rods are provided at the transversely extending center line of gravity of the car. The cross torsion rods connect the sprung structure to the automobile wheels through longitudinal members having vertical bending strength and deflect torsionally to resist angular displacement between the frame and wheels of the automobile.

Other objects and advantages of the invention will be set forth in the following description of an embodiment of the invention illustrated in the accompanying drawing.

In the drawing:

Figure 1 is a side view of the automobile suspension of the invention showing the anti-roll mechanism;

Fig. 2 is a top plan view of the automobile suspension employed with the chassis of an automobile;

Fig. 3 is an end view of the suspension from the rear of the automobile chassis; and Fig. 4 is an end view from the front of the automobile chassis.

The frame of the automobile with which the automobile wheel suspension of the invention is applied may consist of two side rails 1, end cross rails 2 and a centrally located cross rail 3.

The four corners of the chassis frame comprising the side and cross rails are supported by coil springs 4 provided as the resilient cushioning means between the frame and the wheels of the automobile or the unsprung and sprung elements thereof. Other types of resilient support may well be utilized.

An equalizer member or rod 5 secured at its center to rear axle 6 by center line pivot 7 operates through the pivot to transfer wheel loads on axle 6 to coil springs 4 at the rear of the vehicle.

The equalizing member or rod 8 secured at its center to front axle 9 by center line pivot 10 operates through pivot 10 to transfer wheel loads on the front axle 9 to coil springs 4 at the front of the vehicle.

Pivots 7 and 10 are preferably formed with a rubber bushing and the pivot action occurs in the rubber bushed portion of the pivot. The pivots are located on the longitudinal center line of the frame.

The members 5 and 8 are preferably pressed steel members of light weight and substantial rigidity.

Instead of pivoting members 5 and 8 to the respective axles and supporting the springs 4 thereon, the members 5 and 8 may be supported on top of springs 4 which would then be supported directly by the respective axles, and the frame would have its cross bars 2 pivoted at the center upon the members 5 and 8, respectively.

The arrangement employed may be determined by the clearances available and the type of axle utilized. Other types of axle than the one shown may be used.

Suitable energy dissipation devices, such as shock absorbers, not shown, may be applied across the springs or at other desirable locations to temper the movement of springs 4.

The springs 4, equalizing members 5 and 8, and center line pivots 7 and 10 under the arrangement described, apply force to the frame substantially only at the car center line under non-uniform wheel loading conditions. However, without additional support the sprung structure tends to roll over on the pivot pins under the influence of side loadings in service.

To counteract the roll over, cross-torsion rods 11 and 12 are pivotally secured to the frame side rails 1 at approximately the transverse center line of the frame such as by brackets 13. These brackets may be provided with rubber bushings to temper the noise characteristics of the car as the pivoting action occurs in the bushing.

A pair of levers or beam members 14 are rigidly secured to torsion rod 11 and extend rearwardly in parallel relation adjacent the side rails to the rear axle 6 to which the levers are pivotally attached such as by brackets 15 preferably provided with rubber bushings.

In the same manner a pair of levers 16 rigidly secured to torsion rod 12, extend forwardly in parallel relation to the front axle 9 to which the levers 16 are pivotally attached as by brackets 17 provided with rubber bushings similarly to brackets 15.

The lever members 14 and 16 are preferably formed of channel cross-section and are of sufficient rigidity to operate effectively as force transmitting members.

Roll over of the sprung structure, with the system described effects angular deflection of torsion rods 11 and 12. The degree of resistance to torsional deflection incorporated into the torsion rods will determine the rate of roll over.

When the vehicle is in service, impact at one wheel will cause a vertical force reaction at the connection of the torsion rod to the frame. The torsional resistance of the torsion rods should be only sufficient to properly stabilize roll over to provide adequate car control.

Under the present invention the road forces created in the wheels and axles and applied to the frame are effectively transferred to the torsion rods 11 and 12 and substantially eliminated from the frame ends.

By locating the rods 11 and 12 at substantially the transverse center line of mass of the sprung structure, the mass effect is balanced about the point of force application with deflection being resisted by the vertical bending rigidity of side rails 1 which are of one piece construction.

Loading applied at one side of the vehicle will tend to cause loss of planarity through vertical deflection of the frame cross members 2 and 3 tieing the rails 1 together. The cross members may be readily proportioned to resist such deflection.

The invention minimizes deflection and distortion of the frame and body of the automobile when the wheels receive impact forces from uneven road surfaces. This achieves desirable qualities in the noise and feel characteristics of the car.

In addition, the elimination of deflection effects utilization of a greater portion of the car weight as inertia for resisting displacement of passengers in operation of the car.

Various embodiments of the invention may be employed within the scope of the accompanying claims.

I claim:

1. In an automobile, a frame, road wheels and axles, and a floating support for the frame upon the road wheels thereof, comprising means at each end of the frame to resiliently support the same upon the corresponding wheels at the respective ends and embodying pivotal connections with said axles axially coinciding with the approximate longitudinal center line of the frame, and torsion means disposed transversely across the approximate center of mass of the frame and connected to the respective wheels to prevent roll of the frame on said pivotal connections.

2. In an automobile, a frame, road wheels and axles, and a floating support for the frame upon the road wheels thereof, comprising means at each end of the frame to resiliently support the same upon the corresponding wheels at the respective ends and embodying pivotal connections with said axles axially coinciding with the approximate longitudinal center line of the frame, a pair of torsion rods carried by the frame transversely thereof at the approximate center of mass thereof, a lever arm fixed to each end of one of said torsion rods and extending forwardly therefrom to connect with the respective forward wheel, and similar lever arms secured to the ends of the other torsion rod and extending rearwardly therefrom to connect with the corresponding rear wheels.

3. In an automobile, a frame, road wheels and rear and forward axles, and a floating support for the frame upon the road wheels thereof, comprising means at each end of the frame to resiliently support the same upon the corresponding wheels at the respective ends and embodying pivotal connections with said axles axially coinciding with the approximate longitudinal center line of the frame, cross members upon which the frame is sprung with said pivotal connections joining said axles and cross members, a pair of torsion rods carried by the frame transversely thereof at the approximate center of mass thereof, a lever arm fixed to each end of one of said torsion rods and extending forwardly therefrom to connect with the respective forward axle, and similar lever arms secured to the ends of the other torsion rod and extending rearwardly therefrom to connect with the corresponding rear axle.

4. In an automobile, in combination with the axles and frame thereof, an automobile wheel suspension comprising an equalizing bar spaced from each axle and pivoted thereto at substantially the center line of the automobile, resilient spring means supporting the corners of the frame upon the ends of said equalizing bars, a pair of cross torsion members pivoted to the frame at approximately the center of mass of the automobile, a pair of lever members secured to one of the cross torsion members at opposite ends and to one of the axles at the corresponding ends, and another pair of lever members secured to the other torsion member at opposite ends and to the other axle at the corresponding ends thereof.

5. In an automobile, in combination with the axles, wheels and frame thereof, an automobile wheel suspension comprising a transverse equalizer bar at each end of the automobile spaced between the respective axle and frame member and pivoted to one of said members at substantially the longitudinal center line of the automobile, resilient means disposed between the equalizer bar and the other member on opposite sides of the pivotal connection, cross torsion rods secured to the frame and extending in spaced, parallel relation across the frame at the approximate center of mass of the automobile, and means connecting each cross rod to an axle of the automobile to effect torsional deflection of the cross rods when one wheel moves vertically in relation to the frame during operation of the automobile in service.

6. In an automobile, in combination with an axle and frame thereof, an automobile wheel suspension comprising a transverse equalizing bar spaced between said axle and frame members and pivoted to one of said members at the center of the same, resilient means disposed between the equalizing bar and the other member on opposite sides of the center of the bar, cross torsion rods secured to said frame in spaced parallel relation intermediate the axles of the automobile, and lever arms joining each cross rod to an axle of the automobile to transmit angular deflection of the axle to the cross rods.

7. In an automobile, in combination with the axles, wheels and frame thereof, an automobile wheel suspension comprising an equalizing bar spaced from said axle and pivoted to the center thereof by a rubber bushed pivot, resilient means disposed between the equalizing bar and frame on opposite sides of the center of the bar, a pair of cross torsion rods pivoted to said frame by a rubber bushed pivot and extending in parallel relation intermediate the axles of the automobile, and a pair of lever members joining each cross torsion rod to an axle to torsionally deflect the cross rods when the wheels move vertically in relation to one another and the frame, said lever members being fixedly secured to a cross rod at one end and pivoted to an axle at the other end by a rubber bushed pivot to improve undesirable noise characteristics of the automobile.

8. In an automobile having sprung and upsprung structure, an automobile wheel suspension comprising pivot supporting means disposed between the sprung and unsprung structure at substantially the longitudinal center line of the automobile, and additional supporting means at each side of the automobile extending from the respective wheels to substantially the transverse mass center line of the sprung weight to resist the roll over tendency of the automobile created by the angular deflection of the unsprung structure on uneven road surfaces.

9. In an automobile, in combination with an axle and frame thereof, an automobile wheel suspension comprising a transverse equalizing bar spaced between said axle and frame members and pivoted to one of said members at the center of the same, resilient means disposed between the equalizing bar and the other member on opposite sides of the center of the bar, a cross torsion rod pivotally secured to opposite sides of said frame near the vertical plane of the transverse center line of the sprung mass, and lever arms joining the opposite ends of said torsion rod to the corresponding ends of said axle.

DONALD W. SHERMAN.

REFERENCES CITED

The following references are of record in the file of this patent:

UNITED STATES PATENTS

| Number | Name | Date |
|---|---|---|
| 1,120,036 | Dearing | Dec. 8, 1914 |
| 1,026,851 | Dearing | May 21, 1912 |